United States Patent [19]

Simpson et al.

[11] 4,085,170

[45] Apr. 18, 1978

[54] METHOD AND APPARATUS FOR INCREASING CONTACT AREA IN A MULTI-PHASE SYSTEM

[75] Inventors: David Preston Simpson; James Lawton, both of Chester, England

[73] Assignee: The Electricity Council, England

[21] Appl. No.: 675,415

[22] Filed: Apr. 9, 1976

[30] Foreign Application Priority Data

Apr. 17, 1975 United Kingdom ............... 15897/75

[51] Int. Cl.² .............................................. B01F 3/04
[52] U.S. Cl. ........................................ 261/1; 204/149; 250/531; 261/122; 261/124; 261/DIG. 48; 366/127
[58] Field of Search ........................... 261/1, 122-124, 261/DIG. 48; 204/149, 164; 250/531; 259/DIG. 41, DIG. 42, DIG. 43, DIG. 44

[56] References Cited

U.S. PATENT DOCUMENTS

| | | | |
|---|---|---|---|
| 1,180,372 | 4/1916 | Breydel | 250/531 X |
| 2,229,679 | 1/1941 | Slayter | 250/531 |
| 2,899,371 | 8/1959 | Akerlof | 250/531 X |
| 3,087,840 | 4/1963 | Shaw | 261/DIG. 48 |
| 3,402,120 | 9/1968 | Allen et al. | 204/149 X |
| 3,479,281 | 11/1969 | Kikindai et al. | 204/149 X |
| 3,625,884 | 12/1971 | Waltrip | 204/149 X |
| 3,753,886 | 8/1973 | Myers | 204/149 X |

*Primary Examiner*—Tim R. Miles
*Assistant Examiner*—Richard L. Chiesa
*Attorney, Agent, or Firm*—Beveridge, DeGrandi, Kline & Lunsford

[57] ABSTRACT

The contact area between a first phase of a multi-phase system and a liquid second phase of the system is increased by effecting transient electrical discharges between electrodes immersed in the liquid second phase or in a volume of liquid in acoustic communication with the liquid second phase. The first phase can be in the form of a particulate solid, a gas, or a liquid of lower density than that of the second phase. The first phase is mingled with the second phase by a bubbling technique where the first phase has a lower density than the second phase. The hydraulic shock waves produced by the electrical discharges disperse the bubbles or particles of the first phase in the liquid second phase and thus increase the contact area between the phases.

When the electrodes are immersed in a volume of liquid separate from but in acoustic communication with said liquid second phase, these liquids are separated by means of an acoustically transmissive membrane formed from a thin film of stainless steel or from rubber selected such that the product of density ($\rho$) and velocity of propagation of sound waves (c) is matched to those of the liquids separated by the membrane.

The spacing between the electrodes is adjusted in response to a sensed parameter of the electrical discharges such as to maintain the sensed parameter constant.

11 Claims, 7 Drawing Figures

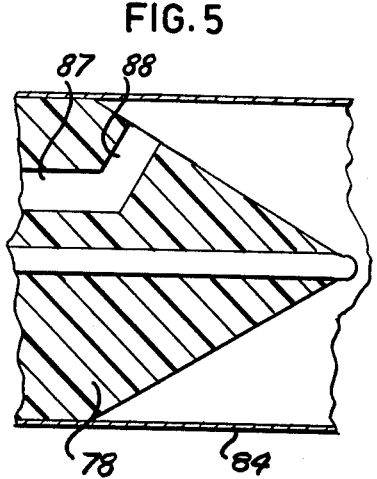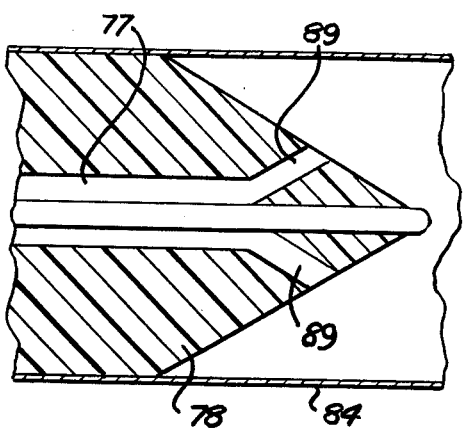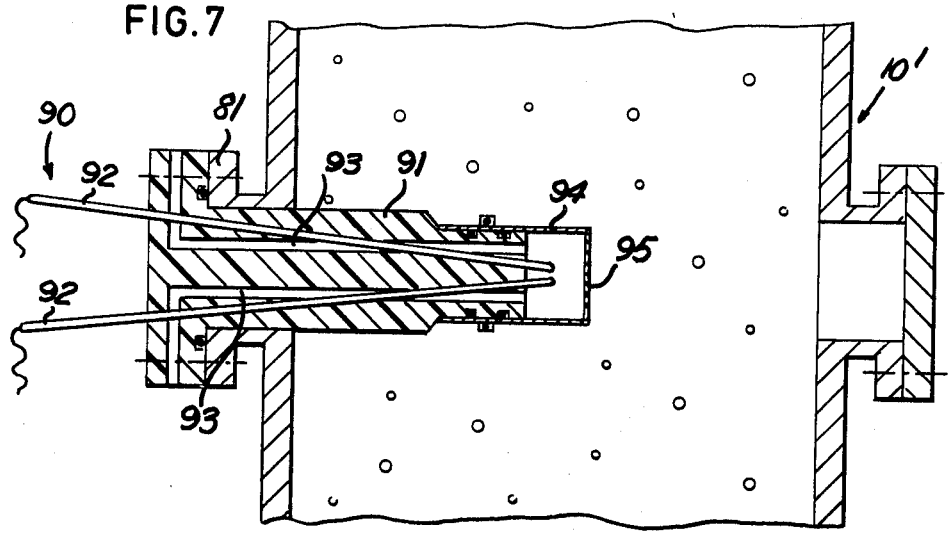

METHOD AND APPARATUS FOR INCREASING CONTACT AREA IN A MULTI-PHASE SYSTEM

BACKGROUND OF THE INVENTION

The present invention relates to increasing contact area between phases in a multi-phase system. Many industrial processes involve the intimate mixing of immiscible liquids or the mixing of one or more gases and a liquid. For the industrial process, which may be a chemical reaction or the transference of heat or mass, to proceed at the greatest rate in such multi-phase systems, it is desirable that the area of contact between the phases in the system is as large as possible.

The mixture of liquids and/or gases may be produced by any of a number of well known means, such as disc aerators or sparge rings, which may be used in conjunction with conventional dispersing systems, such as the well-known paddle and baffle type. For a mixture of liquids and gases, the multi-phase medium will take the form of a cloud of bubbles of the gas or gases dispersed through the body of the liquid or liquids. The bubbles will generally rise through the body of the liquid due to their natural buoyancy, the desired process being intended to occur during the transit of the gas bubbles up through the containing vessel for the liquid. For a mixture of a number of immiscible liquids, bubbles of the less dense liquids form in the most dense liquid and rise up through it.

SUMMARY

According to one aspect of the present invention, a method of increasing contact area in a multi-phase system comprises the steps of mingling a first phase of the system in a liquid second phase of the system and effecting at least one transient electrical discharge in a volume of liquid which is in acoustic communication with said liquid second phase, thereby producing a shock wave in said liquid second phase to disperse said first phase therein. Where the first phase is a gas, or a liquid which is lighter than and immiscible with the liquid second phase, the first phase is, conveniently, bubbled into said liquid second phase and the shock wave is then effective to break up the bubbles of said first phase. It will be understood that by dispersing or breaking up the bubbles of said first phase and reducing their size the total surface area of the first phase is increased thus increasing the contact area between the first phase and the liquid second phase. A transient electrical discharge in a volume of liquid produces a rapidly expanding body of ionised vapour or plasma in that liquid and has the effect of producing a shock wave in the liquid. This effect has been called the "electrohydraulic effect". Provided that the volume of liquid in which the electrical discharge occurs is in acoustic communication with the liquid second phase of the system, the shock wave is transmitted in the liquid second phase and is effective to disperse or break up bubbles of said first phase therein, thereby increasing the contact area between the phases. If the liquid of the second phase is suitable, the electrical discharge may take place directly in said liquid second phase. However, if the liquid second phase is unsuitable, by reason of, for example high electrical conductivity, then the electrical discharge is generated in a volume of water or other suitable liquid which is separated from the bulk of the liquid second phase by means of an acoustically transmissive membrane. The acoustic properties of the membrane are preferably suitably matched to the liquid in which the discharge takes place, or to the liquid of the second phase or to a suitable mean value between the two, so as to provide optimum transmission of the shock wave produced. The method of the invention may be used continuously to complement the industrial process involving the multi-phase system, in which case a continuous supply of the liquid second phase is fed to a container, a continuous supply of the first phase is introduced or bubbled into the second phase in the container and a continuous series of transient electrical discharges are effected in the volume of liquid in acoustic communication with the liquid second phase in the container, the product of the process being withdrawn from the container, preferably at its top.

According to another aspect of the present invention, an apparatus for increasing contact area in a multi-phase system comprises means for mingling a first phase of the system in a liquid second phase of the system and means arranged to effect at least one transient electrical discharge in a volume of liquid which is in acoustic communication with said liquid second phase, thereby to produce a shock wave in said liquid second phase to disperse said first phase therein. Where the first phase is a gas, or a liquid which is lighter than and immiscible with the liquid second phase, the means for mingling is, conveniently, a means for bubbling the first phase in the liquid second phase. Conveniently, said means for bubbling comprise a container for said liquid second phase, dispersing means in the lower portion of the container for dispersing the first phase as bubbles in said liquid second phase in the container and means for providing a supply of said first phase to said dispersing means. Said means for effecting at least one transient electrical discharge may comprise electrodes, positioned to be immersed in said volume of liquid and an electrical circuit connected to said electrodes and for producing a transient potential difference between said electrodes of sufficient magnitude to cause electrical breakdown between the electrodes in said volume of liquid. The electrodes may be positioned to be immersed in the liquid second phase within the container, said volume of liquid then comprising an element of volume of said liquid second phase; however, when said liquid second phase is unsuitable for the production of an electrical discharge therein, the electrodes may be separated from the interior of the container by means of an acoustically transmissive membrane, means being provided for supplying a suitable liquid for immersing the electrodes. It is preferable that the membrane has acoustic properties which are matched with respect to the liquid used for immersing the electrodes and said liquid second phase of the system so as to provide optimum transmission of the shock wave into the body of the liquid second phase in the container. Suitable membranes may be formed from a rubber selected such that the value of the product of its density ($\rho$) and its velocity of propagation of sound waves (c) matches those of the liquids separated by the membrane. Alternatively, the membrane may be formed from 0.1 mm thick stainless steel film.

The following Examples of the invention are described with reference to the accompanying drawings, in which:

DESCRIPTION OF THE DRAWINGS

FIG. 7 illustrates another different electrode assembly for use in the process chamber of FIG. 1 or FIG. 4.

DETAILED DESCRIPTION

Figure 1:
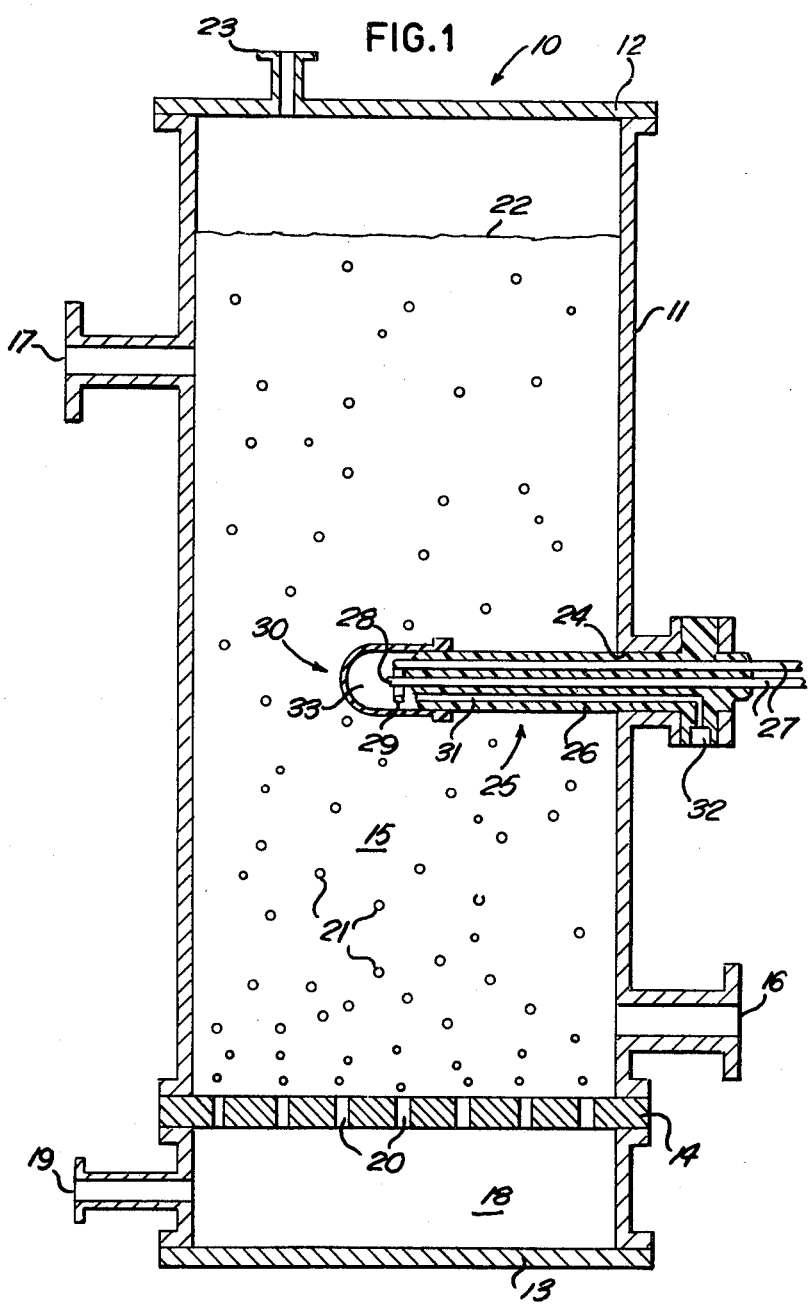
FIG. 1 illustrates a process chamber embodying a method and apparatus of the invention as applicable to a gas/liquid two phase system.

In FIG. 1, a chamber 10 for carrying out a process involving a multi-phase system comprises an upright cylindrical vessel 11 provided with a top plate 12 and a bottom plate 13. A sieve plate 14 is provided near and parallel to the bottom plate 13 and extending across the width of the vessel 11. When the chamber is in use, the liquid 15 forming one of the components of the multi-phase system substantially fills the vessel 11 above the sieve plate 14. The liquid 15 is continuously circulated through vessel 11, entering via a conduit 16 near and above the sieve plate 14 and leaving via a conduit 17 near the top of vessel 11. Beneath the sieve plate 14 there is a space filled with a gas 18 supplied from a conduit 19. Gas 18 comprises another phase of the multi-phase system. The gas 18 is diffused into liquid 15 through apertures 20 in the sieve plate 14 forming bubbles 21 of the gas in liquid 15. Naturally, bubbles 21 tend to rise through the liquid 15 escaping at the surface 22 of the liquid near the top vessel 11 and being withdrawn from the chamber via a conduit 23.

An entrance 24 is provided in the wall of vessel 11 for receiving an electrode assembly 25. The electrode assembly is arranged to make a liquid tight fit in the entrance 24 so as to prevent leakage. The electrode assembly comprises a rod 26 of insulating material extending through the entrance 24. Two conducting rods 27 extend in bores longitudinally of rod 26. At the inner end of the rod 26, the conducting rods 27 provide two electrodes 28 and 29. Electrode 28 is formed as a ring electrode surrounding a bar electrode constituted by the end of the other of conducting rods 27. The rods 27 emerge from the outer end of the insulating rod 26 to form connecting points for connecting to an electrical circuit (not shown in FIG. 1) for producing a discharge between electrodes 28 and 29. Electrodes 28 and 29 are separated from liquid 15 in the interior of vessel 11 by an acoustically transmissive membrane 30 which is formed as a cup sealed around its edges to the peripheral surface of rod 26 near its inner end. A passage 31 is provided along rod 26 for supplying a suitable working liquid, such as water, from a supply point 32 to space 33 around electrodes 28 and 29 as defined by membrane 30, and a further passage (not shown in FIG. 1) is provided along rod 26 for removing liquid from space 33. Continuous circulation of liquid through the space 33 will generally be required to prevent the working liquid from boiling (in the case of water and aqueous solutions), or to remove unwanted chemical products produced by the discharge.

It will be understood that, if liquid 15 constituting one phase of the multi-phase system is suitable for the production of electric discharges therein, then the membrane 30 will not be necessary. It is a further consideration that for electric discharges to be produced directly in liquid 15, such discharges will not produce by-products or have effects tending to interfere with the desired process to be performed in the chamber 10. However, if liquid 15 is unsuitable for electric discharges, being, for example, of a relatively high conductivity, then the membrane 30 will be required to define the region 33 around the electrodes 28 and 29 for containing a volume of a suitable liquid, such as water, for the discharge to take place.

When a transient discharge occurs between the electrodes 28 and 29, an intense disruption of the liquid in the electrode region ensues and a body of highly ionised conducting gas (plasma) is generated. The rapid expansion of this conducting gas or plasma, consequent on the further liberation of the electrical energy from the discharge in the gas, gives rise to a high pressure shock wave or waves propagating outwards from the discharge region through the surrounding liquid. In the case without membrane 30, this shock wave is transmitted through the body of liquid 15 forming one phase of the multi-phase system in vessel 11. When the shock wave impinges on bubbles of gas 18 in the liquid 15, these bubbles are disrupted into a number of smaller bubbles, causing a resultant increase in the total surface area of all the bubbles in liquid 15. Thus the contact area between gas 18 and liquid 15 in the vessel 11 is increased. In the case when membrane 30 is required, shock waves generated in the liquid around the electrodes within the membrane 30 are transmitted through the membrane and into the body of liquid 15. The membrane 30 should be formed of a suitable material so that the shock waves are not substantially attenuated by it. Thus, the membrane 30 is preferably formed from a rubber selected such that the product of its density ($\rho$) and the velocity of propagation of sound waves (c) matches the product $\rho c$ of liquid 15, or that of the liquid within the membrane 30, typically water, or a suitable mean between the two. Instead, the membrane may be formed of 0.1 mm thick stainless steel film, which would be especially suitable for use in chemical reactors, or at elevated temperatures.

The insulating material forming the rod 26 is chosen so as to withstand the chemical conditions within the vessel 11, and to resist the disintegrating effect of the shock waves. Suitable materials are polyethylene, polytetrafluorethylene or polystyrene.

Figure 2:
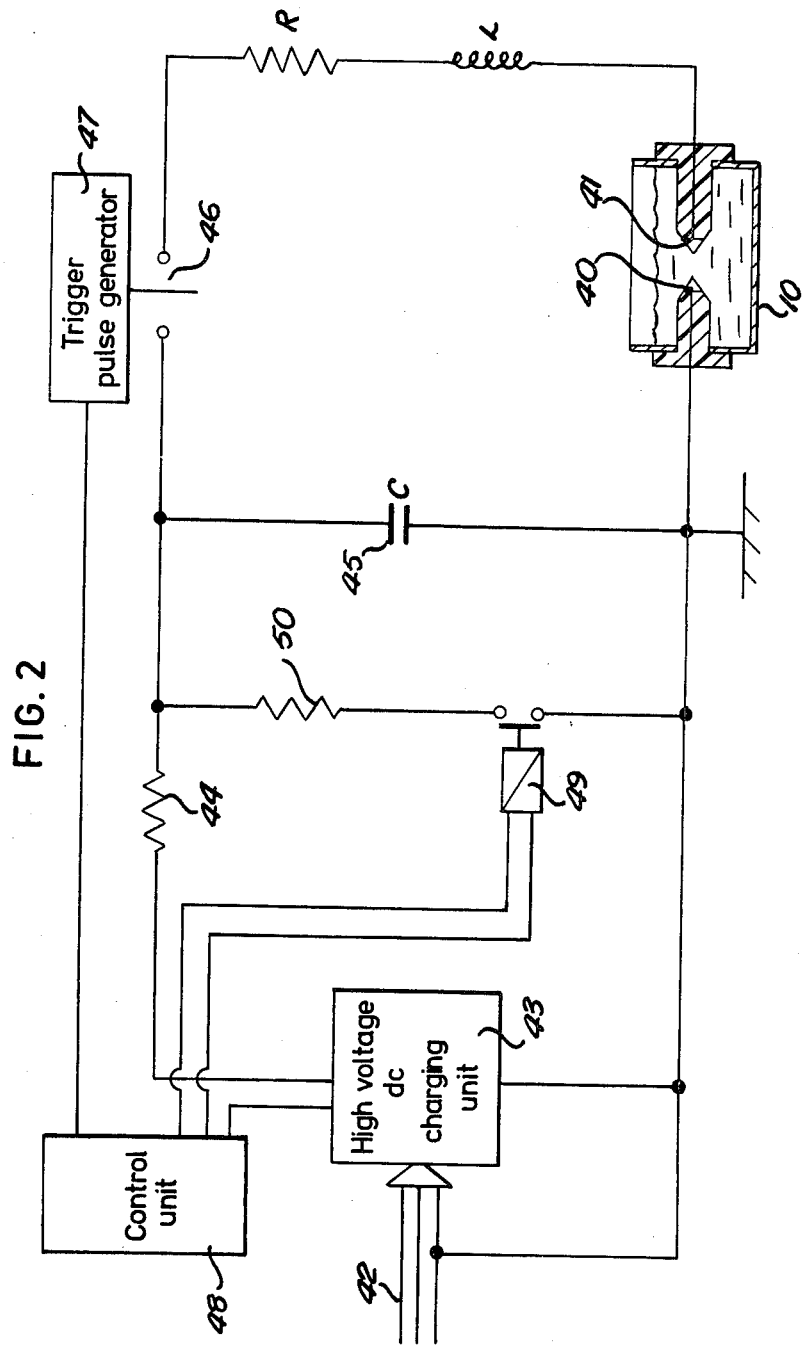
FIG. 2 represents diagrammatically an electrical circuit for producing transient electrical discharges between electrodes in the chamber of FIG. 1.

A suitable circuit for producing a continuous series of transient electrical discharges across electrodes 28, 29 is shown in FIG. 2. The process chamber 10 is shown schematically in FIG. 2 with schematic electrodes 40 and 41 connected in the circuit. Mains power is supplied to the circuit along supply leads 42, feeding a high voltage direct current supply unit 43. The supply unit 43 is connected via a charging resistor 44 across a capacitor 45. In practice the charging resistor 44 may be provided mostly by the resistance of the secondary coil of the high voltage transformer utilised in the supply unit 43. At a suitable point in the charging cycle, normally at or near the maximum voltage attainable on the capacitor 45, a high speed high voltage switch 46 is actuated by means of a trigger pulse generator 47 to connect the capacitor 45 across the electrodes 40, 41 of the chamber 10, thus causing an electrical discharge in the liquid surrounding the electrodes in the chamber. It will be understood that the DC supply unit 43 commonly provides an unsmoothed unidirectional output, employing either full or half wave rectification of the AC mains supply. The trigger pulse generator 47 is controlled by a control unit 48 to provide trigger pulses so that closing of switch 46 is synchronised with the frequency of the mains input for the supply unit 43, so as to provide a repetitive electrical discharge. It will be understood that capacitor 45 has to be charged by the supply unit 43 in the time between two successive discharges. A safety switch 49 is also remotely controlled from the control unit 48 and is operative to connect an emergency discharge resistor 50 in parallel with capacitor 45 to discharge the capacitor when required. The discharge circuit parameters (i.e. the resistance R and inductance L of the discharge current path from capacitor 45 via switch 46 to the electrodes 40 and 41, and also the capacitance C of the capacitor 45 and the voltage to which it is charged) are all chosen to provide a transient discharge between the electrodes in the chamber 10 with desired characteristics, as regards energy dissipation and duration, to produce suitable shock waves in the liquid phase of the system in the chamber 10. Typically, the capacitance of capacitor 45 may be of the order of 1 $\mu$F and the voltage to which it is charged may be about 20 kV.

Instead of the single electrode assembly 25 illustrated in FIG. 1, several such assemblies may be used, either connected in parallel to a single discharge circuit, such as that of FIG. 2 or each connected to a respective discharge circuit. Clearly, different electrode arrangements may be used as may appear suitable for enhancing inter-phase contact in the process concerned. For example, arrangements may be used in which the liquid phase material flows parallel to the sieve path through which the other phase or phases are bubbled, rather than at right angles to the plate as shown in FIG. 1. It may then be convenient to use a number of such sieve plates disposed in parallel with a corresponding number of electrode assemblies operative to disrupt the bubbles produced by each of the sieve plates.

Figure 3:
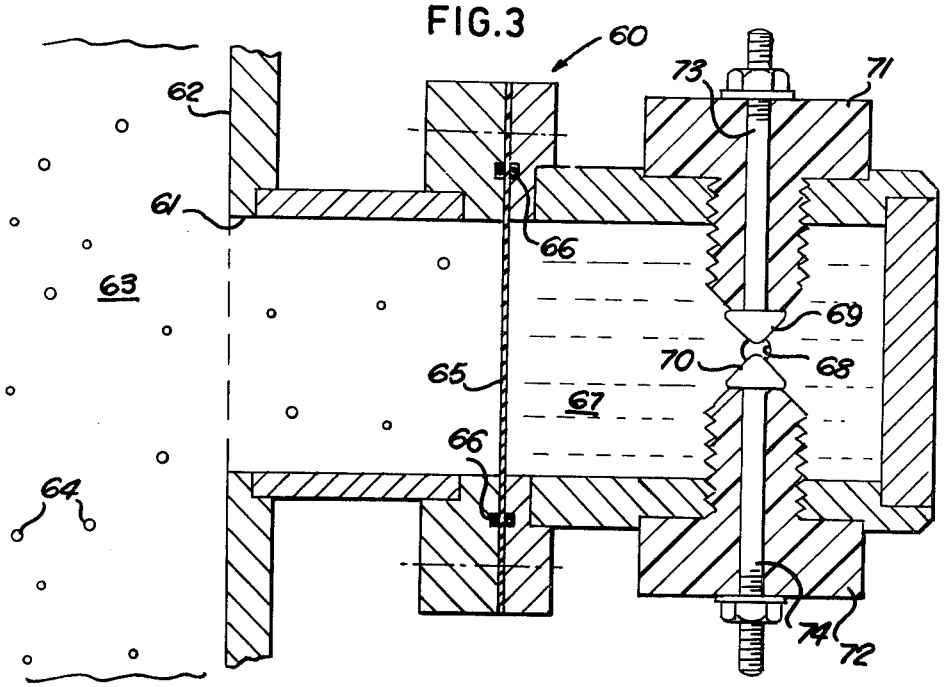
FIG. 3 illustrates a different electrode assembly for use with the process chamber of FIG. 1.

A different embodiment of electrode assembly for producing shock waves in a process chamber is shown in FIG. 3. The electrode assembly is indicated generally at 60 and is mounted in an aperture 61 of a wall 62 of the process chamber, which contains, for example, a liquid phase 63 and bubbles 64. The electrode assembly extends outwardly from the wall of the process chamber and defines a shock wave generating chamber which is divided by a diaphragm 65 formed of an acoustically transmissive material similar to that for the membrane 30 of the arrangement of FIG. 1. The diaphragm 65 is sealed around its periphery to the walls of the shock wave generating chamber by means of a pair of O-rings 66. On the left hand side of the diaphragm 65, as seen in FIG. 3, the shock wave generating chamber is in communication with the body of the liquid phase 63 with bubles 64, though the aperture 61. On the right hand side of the diaphragm, the chamber is filled with a working liquid 67 which circulates via inlet and outlet ports in the wall of the chamber, one of which 68 is shown in the Figure. The working fluid is chosen to be one which is suitable for producing electrical discharges therein and may, typically, be water. Two oppositely pointing conical electrode heads 69 and 70 are mounted to be immersed in the working fluid 67, by means of respective insulating screw-threaded mounting collars 71 and 72. The mounting collars 71 and 72 are screwed in respective holes in opposed wall portions of the electrode assembly 60, and the electrodes have respective rod-like connecting portions 73 and 74 which extend co-axially with the collars 71 and 72 outwardly to provide connecting points for the electrodes outside the chamber of the electrode assembly.

It will be understood that the electrode assembly of FIG. 3 operates in a similar manner to that of FIG. 1. The electrodes 69 and 70 are connected in a circuit, such as that of FIG. 2, to effect electric discharges in the working liquid 67. The shock waves produced by these discharges are transmitted through the acoustically transmissive diaphragm 65 into the liquid phase 63 of the multi-phase system in the process chamber. The shock waves are effective to break up the bubbles in the two-phase system, thereby increasing the contact area between the phases.

Several electrode assemblies 60 may be mounted in respective apertures 61 in the walls of the process chamber to provide a desired distribution of shock wave energy. Clearly, the illustrated electrode assembly 60 is suitable for treating multi-phase systems irrespective of whether or not the liquid phase is suitable for the production of electric discharges therein. However, if the liquid phase is so suitable, then the diaphragm 65 would not be necessary and the liquid phase would constitute the working liquid 67.

Figure 4:
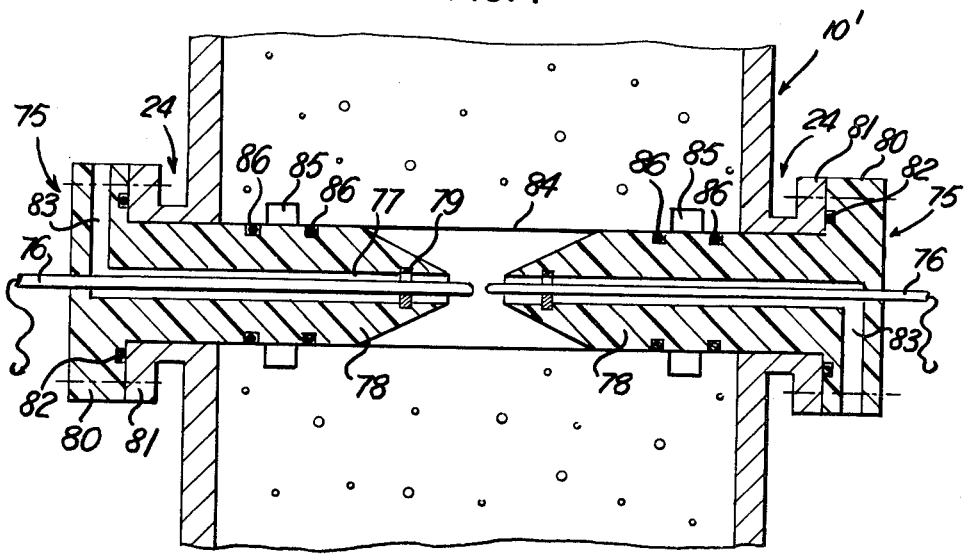
FIG. 4 illustrates part of a modified form of the process chamber of FIG. 1, FIGS. 5 and 6 illustrate parts of different electrode assemblies for use in the process chamber of FIG. 4.

In FIG. 4 a chamber 10' has a pair of diametrically-opposed openings 24 in each of which is mounted an electrode assembly 75 comprising a rod electrode 76 supported within and spaced from a central bore 77 in a mounting sleeve 78 of insulating material by means of a spacer 79. At the outer end of the mounting sleeve 78 is a flange 80 which may be formed integral with collar 78 or may be provided by a separate disc fixed thereto, for securing the sleeve in position by means of bolts connecting the flange 80 to a flange 81 around the opening 24, the joint between flanges 80 and 81 being sealed by an O-ring 82. The electrode 76 is sealed to the outer end of the mounting sleeve or to the separate disc, by means of a gland nut (not shown).

A radial passageway 83 in flange 80 communicates with the outer end of the central bore 77 for the supply, or removal, as the case may be, of a suitable working liquid, such as water.

A tubular membrane 84 encircles the two electrode assemblies and abuts the flanges 80 at its free ends. The membrane is sealed to the sleeves 78 by means of respective clips 85 and associated pairs of O-rings 86, and is formed of the same material as is the aforementioned membrane 30.

The inner ends of the mounting sleeves 78 are frusto-conical in shape and are spaced apart by a small distance near or at the axis of the chamber 10'. The rod electrodes 76, which are longitudinally movable within their mounting sleeves 78, are spaced apart by a suitable distance, typically in the range 2 to 5 mm, for providing a shock wave producing discharge. The electrode gap can be automatically adjusted by a suitable control system (not shown) responsive to changes in the discharge parameters, in particular, the discharge current. For moving the rod electrodes 76 the control system may include means in the form of screw-jacks driven by an electric motor; or hydraulic or pneumatic rams acting on the ends of the rod electrodes; or motor-driven rollers acting on the sides of the rod electrodes 76. It will be appreciated that such means will be suitably insulated in view of the high voltage applied to the rod electrodes 76.

Electrical connection can be made to the rod electrodes 76 by means of flexible braid or cables rigidly attached to the rod electrodes at or near their outer ends, or by means of sliding contacts using, for example, graphite or graphite/copper composite brushes.

The liquid within which the discharge is to take place is supplied via the passageway 83 and bore 77 of one of the electrode assemblies 75 and removed via the corresponding passageway 83 and bore 77 of the other assembly 75. The flow can be pulsed or continuous, as required, and the flow rate might be controlled in dependence upon changes in the discharge parameters in a similar manner to, and either in addition to or instead of, the control of the electrode spacing.

As shown in FIG. 4 the liquid is supplied (or removed) via the bore 77 which is co-axial with the mounting sleeve 78 and the rod electrode 76. If required the bore 77 and rod electrode 76 need not be co-axial. Also, a separate bore may be provided in the mounting sleeve for the supply (or removal) of the liquid. This latter arrangement is shown in FIG. 5 in which the liquid is supplied (or removed) via a longitudinal bore 87 laterally off-set from the axis of mounting sleeve 78. At the inner end of the electrode assembly, bore 87 joins a short passageway 88 which opens onto the frusto-conical surface of the inner end of the mounting sleeve 78, the axis of passageway 88 being substantially normal to this frusto-conical surface.

FIG. 6 shows a modification in which the inner end of bore 77 divides into a plurality of short passageways 89 opening onto the frusto-conical surface of the mounting sleeve 78, as opposed to the single co-axial opening shown in FIG. 4. It will be noted that the axes of passageways 89 are at a smaller angle to the axis of the mounting sleeve than is the axis of passageway 88.

In use, the electrode assembly shown in FIG. 5 will be positioned such that the passageway 88 lies above the rod electrode 76. By this arrangement, gas or vapour bubbles collecting at the upper part of the working volume enclosed by two electrode assemblies and an encircling tubular membrane 84 can be removed since a gas bubble at the membrane may cause damage to, or rupture of, the membrane under shock-loading conditions. If required, the electrode assemblies may be offset slightly in the longitudinal direction of the chamber 10' to facilitate the collecting and removing of such gas or vapour bubbles.

The two electrode assemblies of an arrangement as shown in FIG. 4 need not be identical and are preferably selected to provide optimum conditions for removal of the gas or vapour bubbles. For instance, a combination comprising the assembly shown in FIG. 5 and the assembly shown in FIG. 6 may be used, or again, a combination comprising an assembly as shown in FIG. 4 and the assembly shown in either FIG. 5 or FIG. 6.

FIG. 7 shows an alternative electrode assembly 90 suitable for use in the chamber shown in FIG. 1, or in the chamber shown in FIG. 4. In the latter case, the second opening will be sealed, or if appropriate a further electrode assembly can be used to provide shock waves in-phase or out-of-phase with the first electrode assembly as desired.

Electrode assembly 90 comprises a rod 91 of insulating material which is flanged at its outer end to enable a liquid tight seal to be made with flange 81 of the chamber 10' (or the corresponding flange shown in FIG. 1). Two rod electrodes 92 extend in diametrically-opposed bores inclined to the longitudinal axis of the rod 91, the bores being so disposed as to permit a spacing of the projecting inner ends of the rod electrodes 92 typically in the range 2 to 5 mm. At least one of the rod electrodes 92 is movable in its bore to permit adjustment of the electrode gap by means (not shown) such as mentioned above.

The working liquid is supplied and removed by means of a pair of passages 93 extending longitudinally through rod 91. The outer end portions of the passages 93 are preferably radial and open onto the cylindrical surface of the flanged portion of rod 91, as shown in FIG. 6. If desired, the passages 93 can alternatively extend longitudinally to the rear face of rod 91.

The passages 93 can be co-planar with the rod electrodes 92 or can be in a plane at right angles to that containing the electrodes 92. In another configuration the passages 93 can be co-axial with the electrodes 92, in which case they will substantially constitute the abovementioned inclined bores and there will be provided suitable spacers for supporting the electrodes yet permitting the flow of working liquid.

A membrane 94 secured around the inner end of the electrode assembly is in the form of a thin tube of stainless steel having a welded or brazed-on end plate 95. Alternatively, the membrane 30 used with the assembly shown in FIG. 1 can be used instead of membrane 94.

In use, the electrode assembly will be orientated such that one of its passages 93 is in its uppermost position in the chamber: the working liquid will be introduced via the lower passage 93 and removed via this uppermost passage so as to permit the removal of gas and vapour bubbles as aforementioned.

The rod 26, mounting collars 71 and 72, the mounting sleeve 78, and rod 91 may be made from polyethylene, polytetrafluoroethylene or other suitable plastics material.

In a different application of the invention, immiscible fluids flowing concurrently in a tube or pipe may be induced to mingle intimately by the provision of electrode assemblies in or on the tube walls to produce electrohydraulic shock waves in the flow of liquids.

In a still further application, the invention may be employed to disperse solid particles through a liquid or a mixture of liquids, or of liquids and gases. When a particulate solid is mixed with a liquid, the particles of the solid tend to congregate in clumps, effectively shielding parts of the surfaces of some of the particles from contact with the liquid. The clumps can be held together by surface tension forces and stirring or other normal forms of mechanical agitation are sometimes inadequate to break them up and disperse the particles so that the whole surface of each is exposed to the liquid. Exposing the mixture to hydraulic shock waves produced in the manner of the invention can successfully break up these clumps and disperse the particulate solid. It will be understood that dispersion of solid particles in a liquid may be used, for example, to enhance chemical reactions between the solid and the liquid, or rates of mass or heat transfer, or to induce some desirable physical property in the mixture, such as thixotropy or rheopexy.

We claim:

1. A method of increasing contact area of bubbles of a gaseous phase of a multi-phase system dispersed in a liquid phase of the system, comprising the steps of introducing the gaseous phase into said liquid phase and bubbling said gaseous phase dispersed in said liquid phase, providing a volume of liquid and separating said volume of liquid from said liquid phase by an acoustically transmissive membrane, subjecting said liquid phase containing said bubbles of said gaseous phase to a shock wave for breaking up said bubbles by effecting in said separate liquid at least one electrical spark discharge.

2. A method as defined by claim 1 including the step of selecting the membrane such that its acoustic properties are matched with respect to the liquid in which the electrical spark discharge occurs and said liquid second phase so as to provide optimum transmission of the shock wave into said liquid second phase.

3. A method as defined by claim 1 including the steps of repeatedly effecting electrical spark discharges between spaced electrodes immersed is said volume of liquid, sensing an electrical parameter of the electrical spark discharges and automatically adjusting the spacing of the electrodes in response to the sensed parameter such as to maintain said sensed parameter at a preselected value thereof.

4. A method as defined by claim 1 including the steps of repeatedly effecting electrical spark discharges, sensing an electrical parameter of the electrical spark discharges and automatically adjusting the rate of supply of said liquid in which the electrical spark discharges occur in response to the sensed parameter such as to maintain the sensed parameter at a preselected value thereof.

5. An apparatus for increasing contact area in a multiphase system, comprising a container, means mounted on the lower portion of the container and arranged to disperse a gaseous phase of the system within a liquid phase within the container, means for providing a supply of said gaseous phase to said dispersing means, electrodes mounted in the container and arranged to be immersed in a volume of liquid in acoustic communication with said liquid phase, an acoustically transmissive membrane arranged to separate said volume of liquid from said liquid phase within the container, means arranged to supply said separate liquid for immersing the electrodes, and a spark generating circuit connected to said electrodes and arranged to produce, in use, at least one electrical spark discharge in said separate liquid.

6. An apparatus as defined by claim 5 wherein the membrane is formed from rubber.

7. An apparatus as defined by claim 5 wherein the membrane is formed from 0.1 mm thick stainless steel film.

8. An apparatus as defined by claim 5 wherein the spark generating circuit is arranged to effect electrical spark discharges repeatedly, and including means arranged to sense an electrical parameter of the electrical spark discharges and to adjust the spacing of the electrodes such as to maintain said sensed parameter at a preselected value thereof.

9. An apparatus as defined by claim 5 wherein said spark generating circuit is arranged to effect electrical spark discharges repeatedly, and including means arranged to sense an electrical parameter of the electrical spark discharges and to adjust the flow of liquid supplied for immersing the electrodes such as to maintain said sensed parameter at a preselected value thereof.

10. A method of increasing the contact area of a multiphase system having bubbles of a gaseous phase dispersed in a liquid phase of the system, comprising the steps of introducing the gaseous phase into said liquid phase and bubbling said gaseous phase dispersed in said liquid phase, providing a volume of liquid and separating said volume of liquid from said liquid phase by an acoustically transmissive membrane, and effecting in said separated liquid at least one electrical spark discharge to subject said liquid phase containing said bubbles of said gaseous phase to a shock wave for breaking up said bubbles.

11. An apparatus for increasing contact area in a multiphase system, comprising a container, means mounted on the lower portion of the container and arranged to disperse a gaseous phase of the system within a liquid phase within the container, means for providing a supply of said gaseous phase to said dispersing means, an acoustically transmissive membrane adapted to retain a volume of liquid and arranged to separate said volume of liquid from said liquid phase within the container while maintaining said volume of liquid in acoustic communication with said liquid phase, a plurality of electrodes mounted within said membrane and arranged to be immersed in said volume of liquid, means arranged to supply liquid within said membrane for immersing said electrodes, and a spark generating circuit connected to said electrodes to produce an electrical spark discharge in said volume of liquid.

* * * * *